United States Patent Office 3,809,702
Patented May 7, 1974

3,809,702
N,N'-SUBSTITUTED THIOOXAMIDE, S-OXIDES
Wendell Gary Phillips, Olivette, Mo., assignor to
Monsanto Company, St. Louis, Mo.
No Drawing. Filed Nov. 17, 1971, Ser. No. 199,753
Int. Cl. C07d 27/04, 27/74
U.S. Cl. 260—326.4                    9 Claims

ABSTRACT OF THE DISCLOSURE

N,N'-substituted thiooxamide, S-oxides are prepared from substituted carbamoyl sulfines by reaction with a primary or secondary amine. The compounds of this invention are pesticidally active and particularly useful as selective herbicides.

This invention relates to N,N'-substituted thiooxamide, S-oxides of the formula

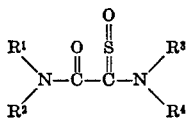

wherein $R^1$, $R^2$ and $R^3$ are each independently alkyl of from 1 through 5 carbons, inclusive, $R^4$ is alkyl of from 1 through 5 carbons, inclusive, or hydrogen, or $R^1$ and $R^2$ or $R^3$ and $R^4$ when taken together are alkylene of the empirical formula $C_nH_{2n}$ wherein $n$ is an integer from 4 through 8, inclusive, and having from 4 through 8 carbons in a continuous chain between the nitrogen terminal valence bonds.

Examples of alkyl of from 1 through 5 carbons include methyl, ethyl, propyl, butyl, pentyl and the various isomeric forms thereof.

Examples of heterocyclic groups of nitrogen and alkylene of the empirical formula $C_nH_{2n}$ wherein $n$ is an integer from 4 through 8, inclusive, and having from 4 through 8 carbons in a continuous chain between the nitrogen terminal valence bonds include, but are not limited to, pyrrolidinyl, piperidinyl, hexamethyleneimino, heptamethyleneimino, octamethyleneimino, 2 - ethylpyrrolidinyl, 3-butylpyrrolidinyl, 2,5-dimethylpyrrolidinyl, 2,5-diethylpyrrolidinyl, 3,4 - dimethylpyrrolidinyl, 2 - pipecolinyl, 3 - pipecolinyl, 4 - pipecolinyl, 2,6 - dimethylpiperidinyl, 2-ethyl-6-methylpiperidinyl, 2-propylpiperidinyl, 3-methylhexamethyleneimino, 3,4 - dimethylhexamethyleneimino, and the various isomeric forms thereof.

N,N'-substituted thiooxamide, S-oxides having the formula

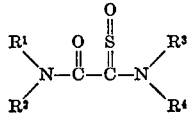

are conveniently and efficiently prepared by the reaction of about one molecular proportion of an N,N-disubstituted 1-thiooxamoyl chloride, S-oxide of the formula

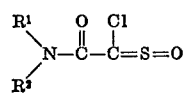

and about two molecular proportions of an amine of the formula

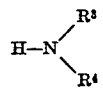

wherein $R^1$, $R^2$, $R^3$ and $R^4$ have the aforementioned significance. This reaction is postulated to proceed as follows:

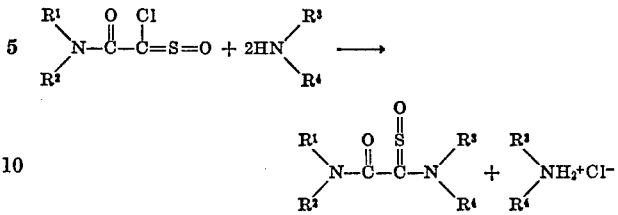

One of the molecular proportions of the amine is consumed by salt formation with the liberated hydrochloride. Where the amine is of high value, difficult to obtain, or for any reason it is desired to minimize the amount of amine used, it may be preferred to conduct the reaction with only one molecular proportion of amine but in the presence of another HCl scavenger. In this embodiment it is postulated that the reaction proceeds as follows:

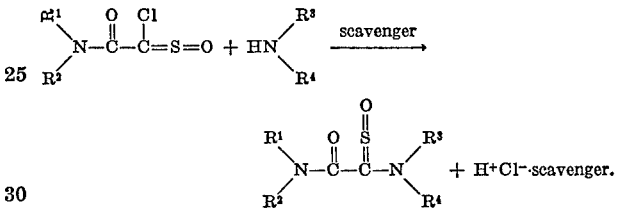

The scavenger must be present in at least one equimolecular amount as compared to the N,N-disubstituted 1-thiooxamoyl chloride, S-oxide. Generally not more than twice the equimolecular amount of scavenger is useful although the maximum amount is not critical. The type of scavenger is not critical to the invention so long as it does not interfere with the reaction of the substituted amine and the N,N-disubstituted 1-thiooxamoyl chloride, S-oxide. Preferred scavengers are trialkyl amines. More preferred trialkyl amines have from 2 through 5 carbons in each of the alkyl groups.

The reaction mass may consist only of the aforedescribed reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by but not limited to aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc. The hydrochloride salt by-product is generally not souble in the above organic solvents but is soluble in water. Accordingly, the insoluble salt forms a precipitate in the reaction mass which is easily removed by filtration. When the organic solvent is not miscible with water and when the salt is soluble in the organic solvent or when filtration is not desired, the salt may be readily removed from the reaction mass by extraction with water.

The reaction is normally carried out at a temperature above the freezing point of the system but preferably not above the boiling point of the system. The reaction is more preferably conducted at a temperature of from about 0 degree centigrade (° C.) and 60° C. The reaction is most conveniently carried out at room temperature, about 23° C., in the presence of an organic solvent. The reaction is usually carried out at atmospheric pressure, but higher or lower pressures may be utilized if equipment and other factors favor such higher or lower pressures. The reaction may be carried out in an open vessel or under reflux.

Amines used in the preparation of the compounds of the present invention are either known compounds or may be prepared by prior art methods from known compounds.

Manufacture of N,N-disubstituted 1-thiooxamoyl chloride, S-oxides used as starting materials in this method for the preparation of the compounds of the present invention, is taught in prior U.S. patent application Ser. No. 194,539, filed Nov. 1, 1971, entitled "Substituted Carbamoyl Sulfines and Their Manufacture," by applicants Wendell Gary Phillips and Kenneth Wayne Ratts.

For convenience, the structure of the compounds of this invention is written herein as

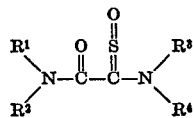

Although the structure of these compounds is not completely understood, it is postulated that

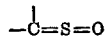

is not linear in configuration but rather is stereospecific having the configuration

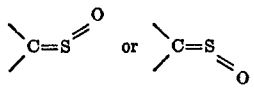

each configuration may have a different melting point and may be considered a different chemical compound. When prepared by the methods described herein, the product may be a pure stereoisomer or a mixture of the two. It is further postulated that the isomers may be rearranged from one configuration to the other simply by heating as, for example, by heating the compound for a brief period of time, about 30 to 60 minutes, on a steam bath. While the two isomers are believed to exist, it is not known in any particular instance whether the compound described is pure or a mixture of isomers. Thus, references, tests and descriptions herein may relate to either one of the pure isomers or a mixture of both.

N,N'-substituted thiooxamide, S-oxides of this invention are useful as biocides. Exemplary of such biocidal uses for these products is the control of nematodes, arachnids, arthropods and insects as well as eradication of noxious weeds. These compounds are particularly useful as contact herbicides.

Herbicidal compounds are useful in the selective killing of weeds in crops. In using the compounds of the present invention as herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the growth media can be carried out by simply applying the formulations to the plants or by employing a liquid carrier to accomplish the penetration and coverage. The application of liquid and particulate solid herbicidal formulations to above ground portions of plants can be carried out by conventional methods, e.g. power dusters, boom and hand sprayers and spray dusters. The formulations can also be applied from airplanes as a dust or a spray because of their effectiveness at low dosages.

The exact amount of active ingredient to be employed is dependent upon the response desired in the plant as well as such other factors as the plant species and stage of development thereof, the amount of rainfall, as well as the specific active ingredient employed. In foliar treatment, the active ingredients are applied in amounts from about 1 to about 50 or more pounds per acre. It is believed that one skilled in the art can readily determine from the teachings of this specification the general procedure for any application.

As illustrative of this invention, but not limitative thereof, is the following.

EXAMPLE 1

To a suitable reaction vessel equipped with an agitator is charged approximately 100 milliliters (ml.) of benzene. Approximately 2 grams (g.), about 0.009 mole, of N,N-diisopropyl 1-thiooxamoyl chloride, S-oxide is added to and dissolved in the benzene. Approximately 1.26 g., about 0.018 mole, of pyrrolidine is then added. The mass is stirred for about 1 hour. The benzene is removed from the reaction mass by vacuum distillation leaving a residual oil. The oil is partially dissolved in 100 ml. of diethyl ether. About 100 ml. of water is added. The portion of the oil which does not dissolve in the diethyl ether dissolves in the water upon stirring. The mass is then allowed to separate into two layers. The aqueous layer is removed in a separatory funnel. The diethyl ether is removed from the organic layer by vacuum distillation leaving a residual oil. The oil is partially dissolved in 100 ml. of petroleum ether. The insoluble portion of the oil is decanted from the ether layer. Upon cooling the remaining ether layer to about 0° C. a precipitate appears. The precipitate is separated from the liquid portion by filtration and then dissolved in and recrystallized from petroleum ether. The yellow solid is found to have a melting point of about 69 to 71° C., to be soluble in acetone, chloroform, ethanol, benzene, ethyl acetate, diethyl ether, and dimethylformamide, and to be insoluble in water and heptane, and is identified by nuclear magnetic resonance, infrared and elemental analysis as $N^1,N^1$-diisopropyl-$N^2$, $N^2$-tetramethylene-2-thiooxamide, S-oxide.

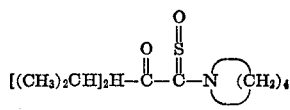

Calculated for $C_{12}H_{22}NO_2S$ (percent): C, 55.78; H, 8.58; N, 10.84. Found (percent): C, 55.64; H, 8.64; N, 10.70.

EXAMPLES 2 THROUGH 17

The procedure of Example 1 is followed except that, in place of about 1.26 g. of pyrrolidine, an approximately equimolecular amount of the compound of column A is charged and the product of column B is obtained.

| Example | A | B |
|---|---|---|
| 2 | CH₃NH₂ | CH₃—NH—C(=S(=O)(=O))—C(=O)—N[CH(CH₃)₂]₂ |
| 3 | [CH₃(CH₂)₄]₂NH | [CH₃(CH₂)₄]₂N—C(=S(=O)(=O))—C(=O)—N[CH(CH₃)₂]₂ |
| 4 | CH₃CH₂CH₂NH | CH₃CH₂CH₂—NH—C(=S(=O)(=O))—C(=O)—N[CH(CH₃)₂]₂ |
| 5 | (CH₂)₇NH | (CH₂)₇N—C(=S(=O)(=O))—C(=O)—N[CH(CH₃)₂]₂ |
| 6 | (C₂H₅)₂NH | (C₂H₅)₂—N—C(=S(=O)(=O))—C(=O)—N[CH(CH₃)₂]₂ |
| 7 | CH(CH₂CH₃)₂ / C₂H₅—NH | CH(CH₂CH₃)₂ / C₂H₅—N—C(=S(=O)(=O))—C(=O)—N[CH(CH₃)₂]₂ |
| 8 | [(CH₃)₂CH]₂NH | [(CH₃)₂CH]₂N—C(=S(=O)(=O))—C(=O)—N[CH(CH₃)₂]₂ |
| 9 | (CH₂)₅NH | (CH₂)₅N—C(=S(=O)(=O))—C(=O)—N[CH(CH₃)₂]₂ |
| 10 | 2,6-dimethylpiperidine (H₃CCH–CH₂–CH₂–CH(CH₃)–NH–CH₂–CH₂) | corresponding N-substituted with —C(=S(=O)(=O))—C(=O)—N[CH(CH₃)₂]₂ |
| 11 | 4-ethylpiperidine (C₂H₅CH on piperidine ring with NH) | corresponding N-substituted with —C(=S(=O)(=O))—C(=O)—N[CH(CH₃)₂]₂ |
| 12 | (CH₃)₂NH | (CH₃)₂N—C(=S(=O)(=O))—C(=O)—N[H(CH₃)₂]₂ |
| 13 | CH₃ / CH₃CH₂CH₂CHNH₂ | CH₃CHNH—C(=S(=O)(=O))—C(=O)—N[CH(CH₂)₂]₂ / CHCH₂CH₂ |
| 14 | [(CH₃)₂CHCH₂]₂NH | [(H₃)₂CHCH₂]₂—N—C(=S=O)—C(=O)—N[CH(CH₃)₂]₂ |
| 15 | (CH₃)₂CHNH₂ | (CH₃)₂CHNH—C(=S(=O)(=O))—C(=O)—N[CH(CH₃)₂]₂ |

TABLE—Continued

| Example | A | B |
|---|---|---|
| 16 | CH₃—NH—CH₂CHCH(CH₃)₂  (i.e., CH₃—NH with (CH₃)₂CHCH₂ branch) | (CH₃)₂CHCH₂CH₂—N(CH₃)—C(=S)—C(=O)—N[CH(CH₃)₂]₂ (S-oxide) |
| 17 | (CH₃)₃CCH₂NH₂ | [(CH₃)₂CH]₂N—; (CH₃)₃CCH—NH—C(=S)(=O)—C(=O)— (S-oxide) |

EXAMPLES 18 THROUGH 24

The procedure of Example 1 is followed except that, in place of about 2 g. of N,N-diisopropyl 1-thiooxamoyl chloride, S-oxide an approximately equimolecular amount of the compound of column A is charged and the product of column B is obtained.

about 6 moles of ethylene oxide per mole of tall oil. The injuries to the plants are then observed approximately 14 days later and the results are recorded.

Contact herbicidal activity of the compound prepared in Example 1 is observed against lamb's-quarter, Canada thistle and quackgrass.

| Example | A | B |
|---|---|---|
| 18 | (CH₃)₂CHCH₂—N[CH(CH₃)₂]—C(=O)—C(=S=O)—Cl | (CH₃)₂CHCH₂—N[CH(CH₃)₂]—C(=O)—C(=S=O)—N(CH₂)₄ |
| 19 | (CH₃CH₂CHCH₂)₂N—C(=O)—C(=S=O)—Cl (with CH₃ branch) | (CH₃CH₂CHCH₂)₂N—C(=O)—C(=S=O)—N(CH₂)₄ |
| 20 | (CH₂)₄N—C(=O)—C(=S=O)—Cl | (CH₂)₄N—C(=O)—C(=S=O)—N(CH₂)₄ |
| 21 | (CH₂)₈N—C(=O)—C(=S=O)—Cl | (CH₂)₈N—C(=O)—C(=S=O)—N(CH₂)₄ |
| 22 | CH(CH₃)CH₂—N—CH₂CH(CH₃) (pyrrolidine-like) —C(=O)—C(=S=O)—Cl | same ring —C(=O)—C(=S=O)—N(CH₂)₄ |
| 23 | CH₃—N(C₂H₅)—C(=O)—C(=S=O)—Cl | CH₃—N(C₂H₅)—C(=O)—C(=S=O)—N(CH₂)₄ |
| 24 | [CH₃(CH₂)₃]₂N—C(=O)—C(=S=O)—Cl | [CH₃(CH₂)₃]₂N—C(=O)—C(=S=O)—N(CH₂)₄ |

EXAMPLE 25

Contact herbicidal activity of a representative N,N'-substituted thiooxamide, S-oxide of this invention is determined by the following procedure:

The compound to be tested is applied in spray form to plants of a given age of several grasses and broadleaf species in an aluminum pan. After the plants are the desired age, each aluminum pan of plants is sprayed with a given volume of a 0.2% concentration solution of the candidate chemical, corresponding to a rate of approximately 3.6 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having

EXAMPLE 26

The procedure for testing insecticidal activity of a representative N,N'-substituted thiooxamide, S-oxide of this invention against the western corn rootworm is as follows:

To a growth pouch (diSPo Seek-Pak growth pouch, catalog No. B1220, of Scientific Products Division of American Hospital Supply Corporation Evanston, Ill.) in an upright position is added 20 ml. of distilled water. Thereafter is added 0.1 ml. of an acetone solution of known concentration in percent by weight of a compound of this invention (for example a 0.1 ml. of a 0.2% by weight acetone solution of the compound provides a concentration of 10.0 p.p.m. thereof). In the trough of the pouch formed by the paper wick thereof are placed two corn seeds (Zea mays, Hybrid U.S. 13) about one inch apart. Thereupon to the trough and between the seeds is added 8 to 12 ready-to-hatch eggs of the western corn rootworm (*Diabrotica virgifera*) which eggs are washed (with distilled water) free of the soil in which they are incubated at room temperature for 21 days immediately prior to their placement in the trough. The so-charged growth pouch is then placed in an upright position in an incubator maintained at 80° F. and 70% relative humidity for 14 days. Immediately thereafter the growth pouches are removed and the extent of kill of the corn rootworm larvae is observed. A 40% rate of kill is observed with the compound of Example 1 applied at rate of 10 p.p.m.

EXAMPLE 27

The procedure of Example 1 is followed except that the amount of pyrrolidine added is approximately 0.63 g., about 0.009 mole, and, in addition, about 0.009 mole of triethyl amine is added with the pyrrolidine. The product of Example 1 is obtained.

EXAMPLES 28 AND 29

The procedure of Example 27 is followed except that in place of triethyl amine about 0.009 mole of the specified trialkyl amine is added with the pyrrolidine. The product of Example 1 is obtained.

Example 28.—Tripropyl amine.
Example 29.—Tributyl amine.

While the illustrative embodiments of the invention have been described hereinbefore with particularity, it will be understood that various other modifications will be apparent to and can readily be made by those skilled in the art without departing from the scope and spirit of the invention.

What is claimed is:

1. An N,N'-substituted thiooxamide, S-oxide of the formula

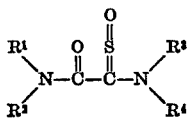

wherein $R^1$, $R^2$ and $R^3$ are each independently alkyl of from 1 through 5 carbons, inclusive, $R^4$ is alkyl of from 1 through 5 carbons, inclusive, or hydrogen, or $R^1$ and $R^2$ or $R^3$ and $R^4$ when taken together are alkylene of the empirical formula $C_nH_{2n}$ wherein $n$ is an integer from 4 through 8, inclusive, and having from 4 through 8 carbons in a continuous chain between the nitrogen terminal valence bonds.

2. A compound of claim 1 wherein $R^4$ is hydrogen.

3. A compound of claim 2 wherein $R^1$ and $R^2$ are each alkyl of from 1 through 5 carbons, inclusive.

4. A compound of claim 2 wherein $R^1$ and $R^2$ when taken together are alkylene of the empirical formula $C_nH_{2n}$ wherein $n$ is an integer from 4 through 8, inclusive, and having from 4 through 8 carbons in a continuous chain between the nitrogen terminal valence bonds.

5. A compound of claim 1 wherein $R^1$, $R^2$, $R^3$ and $R^4$ are alkyl of from 1 through 5 carbons, inclusive.

6. A compound of claim 1 wherein $R^1$ and $R^2$ together, are alkylene of the empirical formula $C_nH_{2n}$ and $R^3$ and $R^4$, taken together, are alkylene of the empirical formula $C_nH_{2n}$.

7. A compound of claim 1 wherein $R^3$ and $R^4$, taken together, are alkylene of the empirical formula $C_nH_{2n}$ wherein $n$ is an integer from 4 through 8, inclusive, and having from 4 through 8 carbons in a continuous chain between the nitrogen terminal valence bonds.

8. A compound of claim 7 wherein $R^1$ and $R^2$ are lower alkyl of from 1 through 5 carbons, inclusive.

9. The compound of claim 8 wherein $R^1$ and $R^2$ are each isopropyl and $R^3$ and $R^4$, taken together are tetramethylene.

References Cited

UNITED STATES PATENTS 2,542,812   2/1951   Hartung _____ 260—558

OTHER REFERENCES

King et al.: Tetrahedron Letters, 1963(9), 585–9.

HENRY R. JILES, Primary Examiner

G. T. TODD, Assistant Examiner

U.S. Cl. X.R.

260—239 BF, 293.85, 326.5 S, 543 R, 561 A; 424—244, 267, 274, 324